US011453617B2

(12) United States Patent
Yen et al.

(10) Patent No.: US 11,453,617 B2
(45) Date of Patent: Sep. 27, 2022

(54) WATER-BASED CERAMIC THREE-DIMENSIONAL LAMINATE MATERIAL AND METHOD FOR USING THE SAME TO MANUFACTURE CERAMIC OBJECTS

(71) Applicant: FRANZ COLLECTION INC., Taipei (TW)

(72) Inventors: Chun-Jung Yen, Tainan (TW); Feng-Ming Yen, Taipei (TW); Ching-Hsing Chang, New Taipei (TW); Chun-Yen Tung, Taipei (TW); Shih-Wei Cheng, Taipei (TW)

(73) Assignee: FRANZ COLLECTION INC., Taipei (TW)

( * ) Notice: Subject to any disclaimer, the term of this patent is extended or adjusted under 35 U.S.C. 154(b) by 755 days.

(21) Appl. No.: 16/403,739

(22) Filed: May 6, 2019

(65) Prior Publication Data
US 2020/0017414 A1 Jan. 16, 2020

(30) Foreign Application Priority Data

Jul. 13, 2018 (TW) ................................. 107124212

(51) Int. Cl.
*B33Y 10/00* (2015.01)
*C04B 35/626* (2006.01)
(Continued)

(52) U.S. Cl.
CPC .......... *C04B 35/6269* (2013.01); *B28B 1/001* (2013.01); *B33Y 10/00* (2014.12);
(Continued)

(58) Field of Classification Search
None
See application file for complete search history.

(56) References Cited

U.S. PATENT DOCUMENTS

2010/0323301 A1* 12/2010 Tang ..................... G03F 7/0037
430/325
2014/0037935 A1* 2/2014 Mori ....................... C09D 7/67
428/312.8
(Continued)

FOREIGN PATENT DOCUMENTS

CN 101053534 A 10/2007
CN 101612793 A 12/2009
(Continued)

OTHER PUBLICATIONS

EP Search Report dated Nov. 15, 2019 in EP application (No. 19173929.1-1019).
(Continued)

*Primary Examiner* — Mohammad M Ameen
(74) *Attorney, Agent, or Firm* — McClure, Qualey & Rodack, LLP (57) ABSTRACT

The invention relates to a water-based ceramic three-dimensional laminate material and a method for using the same material to manufacture the ceramic objects, comprising: a step Sa of preparing a plurality of projected slice graphics and a slurry, wherein the projected slice graphics are formed by slicing a three-dimensional image along a specific direction with a specific thickness, the slurry is prepared by mixing the material powder, the photo-curing resin, the solvent and the additive; a step Sb of uniformly laying the slurry on the substrate to form a sacrificial layer; and a step Sc of uniformly laying the slurry on the slurry to form a reaction layer on the sacrificial layer; a step Sd of irradiating the reaction layer with a light beam according to one of the plurality of projected slice graphics, and the slurry is cured after being irradiated; a step Se of repeating steps Sc and Sd until a ceramic body is formed; a step Sf of washing the ceramic body with water or an organic solvent; and a step Sg (Continued)

of sintering the ceramic body at a high temperature to form a ceramic object.

3 Claims, 5 Drawing Sheets

(51) Int. Cl.
| | |
|---|---|
| *B33Y 70/00* | (2020.01) |
| *B28B 1/00* | (2006.01) |
| *C03C 10/00* | (2006.01) |
| *C04B 35/111* | (2006.01) |
| *C04B 35/486* | (2006.01) |
| *C04B 35/634* | (2006.01) |
| *C04B 35/64* | (2006.01) |
| *C03B 19/01* | (2006.01) |

(52) U.S. Cl.
CPC ............. *B33Y 70/00* (2014.12); *C03C 10/00* (2013.01); *C04B 35/111* (2013.01); *C04B 35/486* (2013.01); *C04B 35/6264* (2013.01); *C04B 35/63416* (2013.01); *C04B 35/63488* (2013.01); *C04B 35/64* (2013.01); *C03B 19/01* (2013.01); *C03C 2204/00* (2013.01); *C04B 2235/3217* (2013.01); *C04B 2235/3244* (2013.01); *C04B 2235/6026* (2013.01)

(56) References Cited

U.S. PATENT DOCUMENTS

2018/0134029 A1    5/2018  Myerberg et al.
2019/0079347 A1*   3/2019  Fuchida ............... G02B 5/3083

FOREIGN PATENT DOCUMENTS

| CN | 104948016 A | 9/2015 |
| CN | 106037967 A | 10/2016 |
| EP | 2666614 A1 | 11/2013 |
| WO | 2004050323 A1 | 6/2004 |
| WO | 2004071327 A1 | 8/2004 |
| WO | 2016164629 A1 | 10/2016 |

OTHER PUBLICATIONS

TW Office Action dated Nov. 26, 2018, TW Application No. 107124212, pp. 1-4.
CN Office Action dated Dec. 28, 2020 in Chinese application (No. 201810768795.9).

* cited by examiner

WATER-BASED CERAMIC THREE-DIMENSIONAL LAMINATE MATERIAL AND METHOD FOR USING THE SAME TO MANUFACTURE CERAMIC OBJECTS

FIELD OF THE INVENTION

The present invention relates to a water-based ceramic three-dimensional laminate material and a method for using the same to manufacture ceramic objects, and more particularly relates to a ceramic material suitable for three-dimensional laminate formation and a method for three-dimensional laminate formation.

DESCRIPTION OF THE PRIOR ART

Typically, in a conventional photocuring technology, commonly known as 3D printing technology, an oil-based slurry is used. If the oil-based slurry is not diluted with a solvent, it is highly viscous and has a viscosity greater than 10,000 cp, resulting in the disadvantages of poor fluidity, difficulty in dispersion, and of remain of bubbles, etc. Hence, lamination of the conventional slurry is difficult and is prone to produce defects in the object. The slurry can not be easily spread flatly due to the high viscosity. In order to uniformly spread the slurry, it is necessary to use slurry rollers together with a scraper that results in a complicated mechanism.

If the oil-based slurry is diluted with a solvent for reduction of the viscosity of the slurry, in order to promote the volatilization efficiency, a highly volatile solvent (such as methanol, which is often toxic and dangerous), which has significant offensive odor, deteriorates the air quality in the manufacturing environment and even harms the health of the operators, has to be used.

During a curing process for each respective layer, due to the characteristics of the slurry used, additional support members are often required to support a body formed of the slurry. In absence of the support members, a body formed of the slurry would be easily broken or deformed, and risk and cost of the process would be increased. If the body is formed and solidified, it is usually necessary to manually refine the surface appearance of the body and to remove the uncured slurry by methanol or other highly toxic solvents in a closed environment after removing the supports members. The uncured slurry cannot be recycled.

Cleaning the formed body is quite complicated because the body must be soaked in an organic solvent and then cleaned with the same. Aside from the annoying odor which will be generated during the cleaning process, when the solvents are inadvertently contacted with human skin, it may cause skin damage. If the operator inhales the excessive gas volatilized from the solvent for a long time, the operator may feel discomfort, and even the operator's health would be affected. It is not easy to clean the body made of the conventional slurry, so that cleaning the body would take a lot of time and has to be carried out carefully. If the body is not rinsed carefully, the body may be damaged.

SUMMARY OF THE INVENTION

The main object of the present invention is to provide a water-based ceramic three-dimensional laminated material and a method for using the same to manufacture ceramic objects, by which ceramic objects in an arbitrary shape can be efficiently formed without using support members. The unpleasant odor and the volatilization of the toxic substances in the environment are greatly reduced during the process. Hence, a safe, non-toxic process is provided, and a slurry recovery mechanism is further provided. As such, cleaning of the body can be performed in a quite convenient, easy and fast way.

In order to achieve the above object, a method for manufacturing the ceramic objects using a water-based ceramic three-dimensional laminate material at least comprises:

a step Sa of preparing a plurality of projected slice graphics and a slurry, wherein the plurality of projected slice graphics are formed by slicing a three-dimensional image of the object along a specific direction with a specific thickness; the slurry is prepared by mixing material powder, a photo-curable resin, a solvent and an additive; the material powder comprising at least one of aluminum oxide powder, zirconium oxide powder and glass ceramic powder; the photo-curable resin comprising at least one of a water-soluble resin and a water-dispersible resin; the solvent being water or mixed solvent comprising water and alcohols; the additive at least comprising one of a dispersant, a binder, and a plasticizer;

a step Sb of uniformly laying the slurry on a substrate to form a sacrificial layer;

a step Sc of uniformly laying the slurry on the sacrificial layer to form a reaction layer;

a step Sd of irradiating light beam to the reaction layer by using one of the plurality of projected slice graphics, so that the slurry on the reaction layer is cured by the irradiation of the light beam, the light beam emitted from a light source is a visible light or an ultraviolet light, and the light source is provided above the substrate;

a step Se of repeating the steps Sc and Sd until forming a ceramic body;

a step Sf of cleaning the ceramic body; and a step Sg of sintering the ceramic body at a high temperature to form the ceramic object.

Since the ceramic object is manufactured by using a three-dimensional laminate layer manufacturing technique, the type of the ceramic object is not limited. For example, the ceramic object may be a dental crown, an implant (such as a conical implant, an implant with a prosthetic root, an implant with an abutment, etc.), and a porcelain tooth with a crown and an implant formed integrally. According to the present invention, support members used in the conventional 3D printing are replaced with a sacrificial layer, and hence the procedure for removing the support members after the body is formed is not necessary. The invention adopts a water-based material, which is environmentally friendly, safe, non-toxic and more convenient to clean.

The present invention provides a method of manufacturing a ceramic object by a three-dimensional laminate manufacturing technique, wherein each of the projected slice graphics includes a slice pattern of a 3D ceramic object and at least one slurry recovery pattern; a ceramic body being formed from the slice patterns, and a recovery body being formed from the slurry recovery patterns as described in the step Se; and the recovery body is recovered in the step Sf. The recovery body after being photocured facilitates recycling the slurry for reuse without causing environmental pollution.

More preferably, the present invention provides a method of manufacturing a ceramic object by a three-dimensional laminate manufacturing technique, wherein in the step Sf, water or an organic solvent at a temperature of 25 to 50° C. is used for cleaning, thereby shortening the time necessary for cleaning the ceramic body. The substrate of the present invention may be composed of a material or structure having a water absorption rate of 5% or more. Water or other solvent in the sacrificial layer and the reaction layer can be absorbed by the substrate, and the reaction layer can be photocured immediately after the reaction layer is laid, and the process efficiency can be significantly improved without wasting the time for evaporation or volatilization of the water.

In order to achieve the above object, a water-based ceramic three-dimensional laminate material of the present invention comprises: material powder, a photo-curable resin, a solvent and an additive, the material powder comprising at least one of aluminum oxide powder, zirconium powder and glass ceramic powder, the photo-curable resin comprises at least one of a water-soluble resin and a water-dispersible resin, wherein the solvent is water or a mixed solvent comprising water and alcohols, the additive comprising at least one of a dispersing agent, a binder and a plasticizer. In the case that the solvent is water, an amount of the solvent is 10% or more by weight of the laminate material. In the case that the solvent is a mixed solvent, an amount of the water is 50% or more by weight of the mixed solvent. It can be seen that the material used in the present invention is water-based, the manufacturing process is safe and non-toxic, and cleaning is convenient, and the slurry can be recycled and reused.

The present invention relates to a water-based ceramic three-dimensional laminate material, wherein the material powder is 53 to 83 parts by weight, the dispersant is 0.5 to 3.5 parts by weight, the plasticizer is 0.5 to 5 parts by weight, and the binder is 2 to 7 parts by weight, the photo-curable resin is 7 to 20 parts by weight, and the solvent is 10 to 28 parts by weight.

The present invention provides a water-based ceramic three-dimensional laminate material, wherein the dispersant comprises at least one of a polycarboxylate, a polymer ammonium salt, and a polymer sodium salt; the plasticizer comprises at least one of polyethylene glycol and glycerin having a molecular weight ranging from 150 to 450. Further, the present invention provides a water-based ceramic three-dimensional laminate material, wherein the binder comprises at least one of polyethylene glycol, polyvinyl alcohol and polyethylene oxide having a molecular weight ranging from 1,500 to 8,000.

The present invention provides a water-based ceramic three-dimensional laminate material, wherein the slurry has a viscosity smaller than 1000 cp so that less bubbles will remain in the slurry, and the bubbles can be removed easily. The production efficiency is improved, the sacrificial layer and reaction layer can be laid uniformly, and the thickness of the reaction layer can be easily controlled.

DETAILED DESCRIPTION OF THE INVENTION (PREFERRED EMBODIMENTS)

Before a water-based ceramic three-dimensional laminated material and a method for using the same to manufacture the ceramic objects of the present invention are described in detail in the present embodiment, it is to be noted that in the following description, similar elements will be denoted by the same reference numerals. The drawings of the present invention are merely for illustrative purpose and are not necessarily drawn to scale, and all details are not necessarily shown in the drawings.

Figure 1:
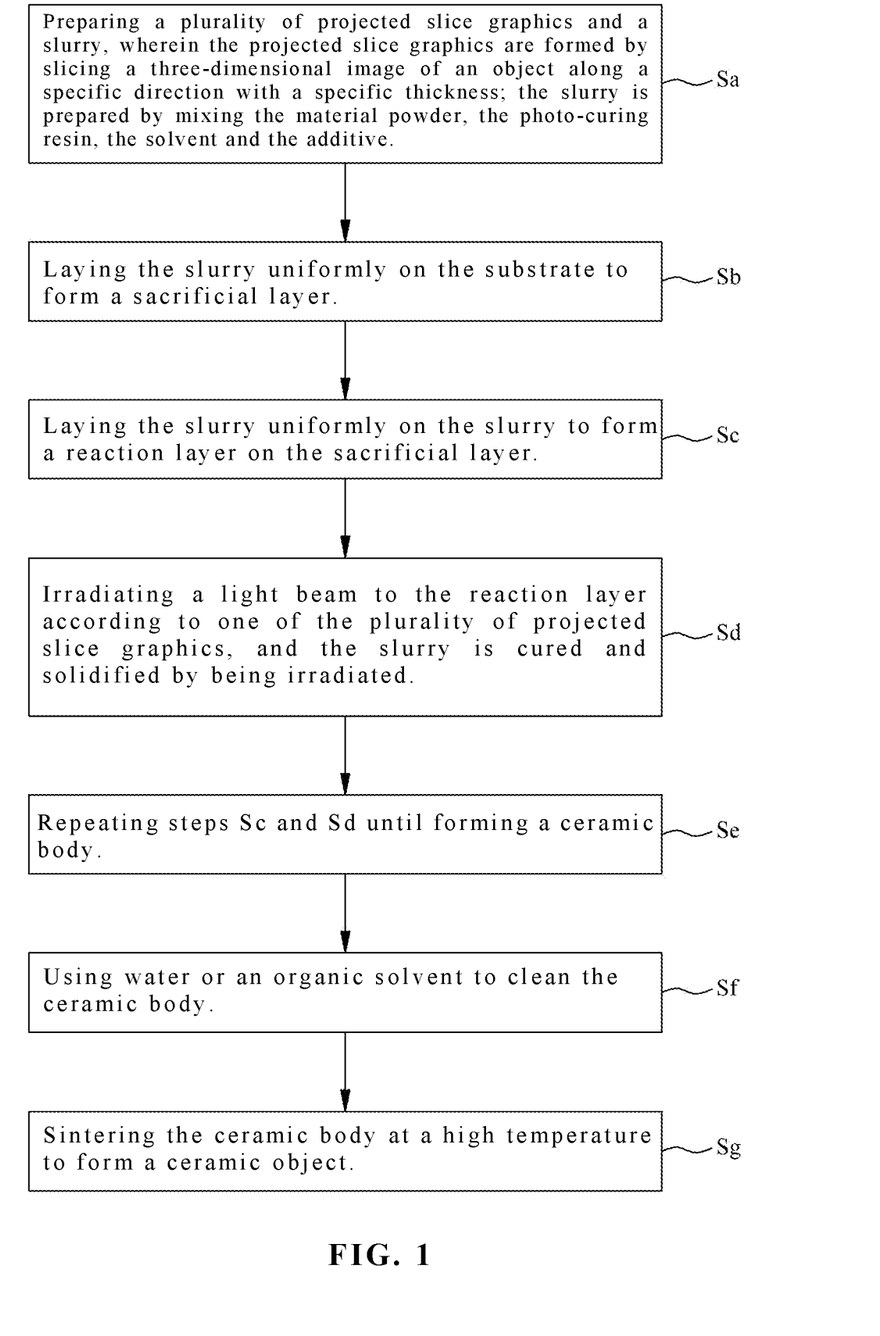
FIG. 1 is a flow chart of a method for manufacturing a ceramic object utilizing a three-dimensional laminate manufacturing technique in accordance with an embodiment of the present invention.
Figure 2:
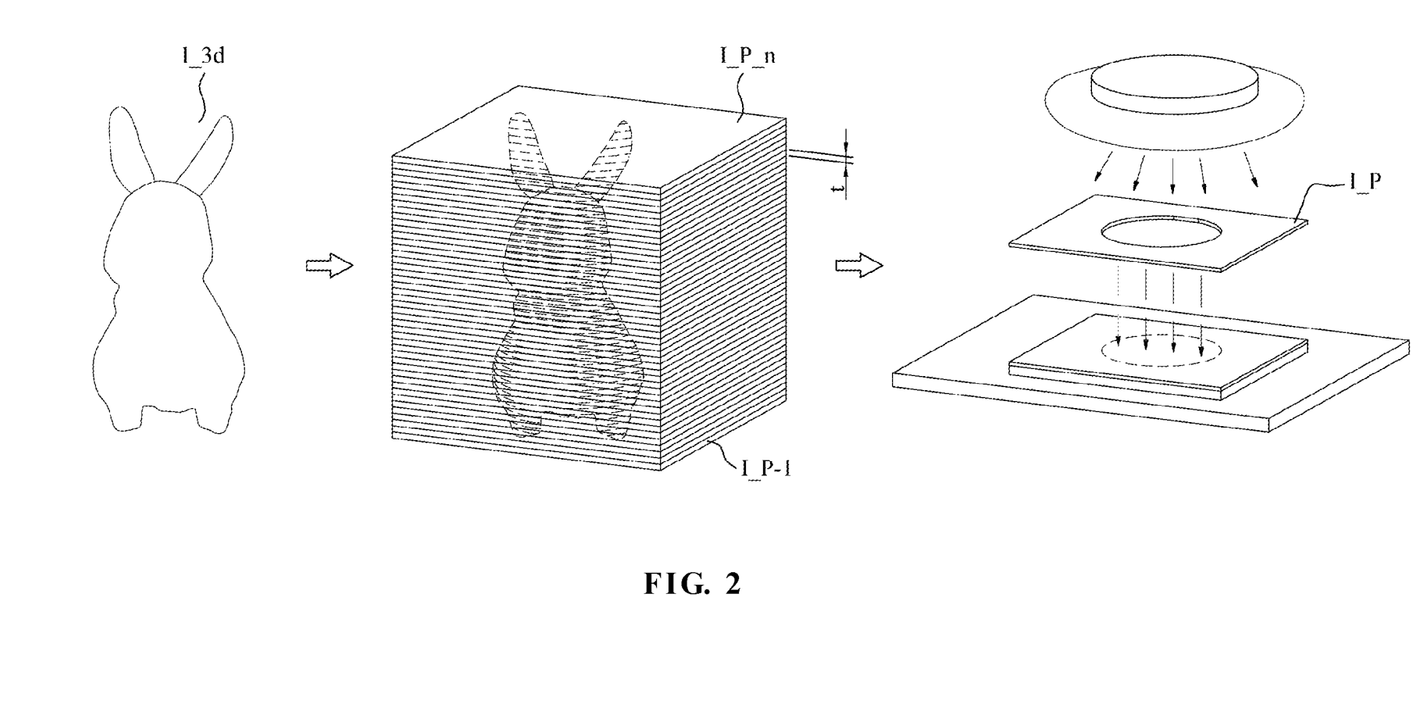
FIG. 2 is a schematic view showing slicing a three-dimensional image of the object and photocuring in accordance with an embodiment of the present invention.

Referring to FIG. 1 and FIG. 2, FIG. 1 is a flow chart of a method for manufacturing a ceramic object utilizing a water-based three-dimensional laminate manufacturing technique in accordance with an embodiment of the present invention, and FIG. 2 is a schematic view showing slicing a three-dimensional image of the body and photocuring in accordance with an embodiment of the present invention. It should be noted that the ceramic object is to be formed into a rabbit shape in the embodiment, but the shape or type of the invention is not limited thereto. The ceramic object manufactured according to the inventive method may be any type of object, such as a ceramic denture, a jewelry accessory, or any other fine object.

As shown in the figures, a plurality of projected slice graphics P and a slurry are prepared in the step Sa. Especially, as shown in FIG. 2, each of the projected slice graphics P is a cross-sectional image obtained by cross-cutting a three-dimensional image data R for a specific ceramic object to be laminated in a horizontal direction with a specific thickness. More specifically, the three-dimensional image data R for the ceramic object is sliced by an image processing unit at a thickness t of a reaction layer (see below), and hence the plurality of projected slice graphics P_1 to P_n are obtained layer by layer. The plurality of projected slice graphics P_1 to P_n can be used for laminating the ceramic object. The three-dimensional image data R can be obtained by an optical 3D scanning system or by computer aided design (CAD).

Figure 4A:
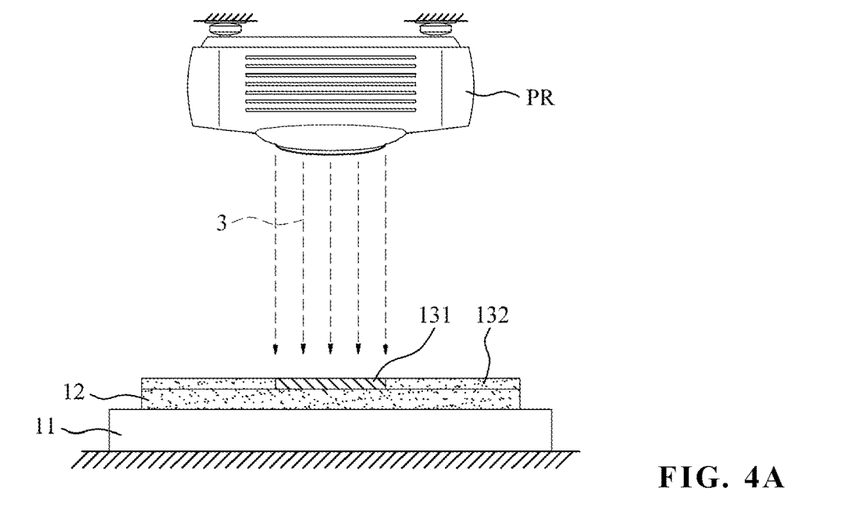
FIG. 4A is a schematic view showing the irradiating of the reaction layer with a light beam in accordance with an embodiment of the present invention.
Figure 4B:
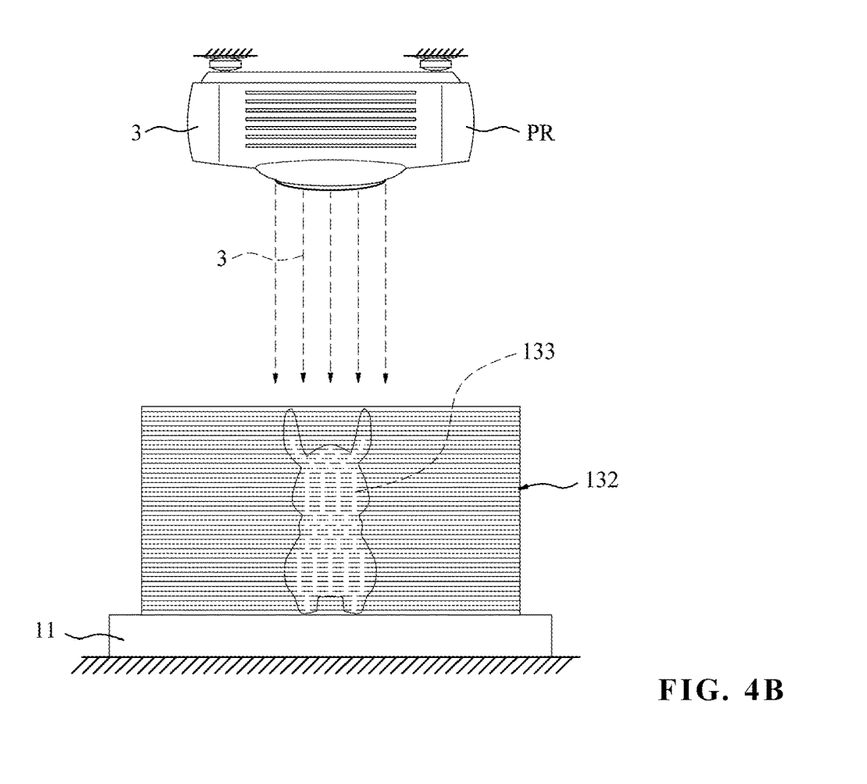
FIG. 4B is a schematic view showing laminating a ceramic body in the sacrificial layer in accordance with an embodiment of the invention.

It should be particularly noted that FIG. 2 illustrates irradiating a light beam on the slurry via a slice graphic P to form a ceramic body layer 130, that is, a layer constituting a part of the ceramic object. This embodiment is provided for illustrative purpose. For the current technology, a photo mask may not be required since an optical machine PR (as shown in FIG. 4A and FIG. 4B) is capable of projecting a patterned light spot. The details will be described later.

A slurry which is formed of material powder, a photo-curable resin, a solvent, and an additive. The material powder may be at least one of alumina powder, zirconia powder, and glass ceramic powder, and the photo-curable resin includes at least one of a water-soluble resin and a water-dispersible resin. For the present embodiment, the photo-curable resin is mainly composed of 30 to 55% by weight of acrylate monomers (Acylate Monomers), 30 to 40% by weight of acrylate oligomers (Acylate Oligomers), 1-4% by weight of photoinitiators, and 0 to 2% by weight of additive, in which the additives are optional.

The solvent may be pure water or a mixed solvent of water and alcohols selected from, for example, at least one of ethanol (ET), isopropyl alcohol (IPA), propanediol glycol (PG) and hexanediol (HG). Preferably, the water is deionized water. For example, in the case that the solvent is pure water, the amount of the solvent is 10% or more by weight of the slurry. Alternatively, in the case that the solvent is a mixed solvent including water and alcohols, the amount of the mixed solvent is 10% or more by weight of the slurry, and the amount of water is 50% or more by weight of the mixed solvent.

According to this embodiment, a mixed solvent comprising water and ethanol is used, wherein ethanol is used as a resin solubilizer to reduce the porosity. According to experiments, the porosity of the ceramic body ranges from about 2% to about 10% if ethanol is not used as a resin solubilizer. If ethanol is used as a resin solubilizer, the porosity is greatly reduced to 2% or less. Ethanol has a good solubility as compared to other resin solubilizers so that the less amount of ethanol may be satisfying. Ethanol is relatively safe if the slurry comes into contact with the skin. In addition, the use of a small amount of ethanol can effectively reduce the surface tension of water, which can reduce cracks or coating defects such as shrinkage cavities or depressions when stacking nano-powder material.

The additive includes at least one of a dispersant, a binder, and a plasticizer. More specifically, the dispersant comprises at least one of a polycarboxylate, a polymer ammonium salt (such as ammonium polyacrylate), and a polymer sodium salt (such as sodium polyacrylate). The dispersant functions to: (1) shorten the time necessary for the deagglomeration of the agglomerated material powder and shorten the dispersion time; and (2) delay the re-agglomeration of the material powder and keep the powder in a dispersed state for a long time.

In addition, the plasticizer comprises at least one of polyethylene glycol (for example, PEG #200, PEG #400) and glycerin (glycerol) having a molecular weight ranging from 150 to 450, and the plasticizer is used for reducing the glass transition temperature of the binder to make the binder have better flexibility at normal temperature. The binder comprises at least one of polyethylene glycol having a molecular weight ranging from 1500 to 8000 (for example, PEG #2000, PEG #4000, PEG #6000), polyvinyl alcohol, and polyethylene oxide. The binder provides functions to enhance the strength of the ceramic body after drying, resist shearing forces during blade coating and adjust viscosity to prevent particle settling.

Preferably, with respect to 100 parts by weight of the slurry, the material powder is 53 to 83 parts by weight, the dispersant is 0.5 to 3.5 parts by weight, the plasticizer is 0.5 to 5 parts by weight, the binder is 2 to 7 parts by weight, and the photo-curable resin is 7 to 20 parts by weight, and the solvent is 10 to 28 parts by weight. According to the above composition ratio, the viscosity of the slurry is smaller than 1000 cp and has a better fluidity. Less bubbles would be generated due to the low viscosity of the slurry, and the bubbles can be easily removed. Therefore, productivity is improved.

Figure 3A:
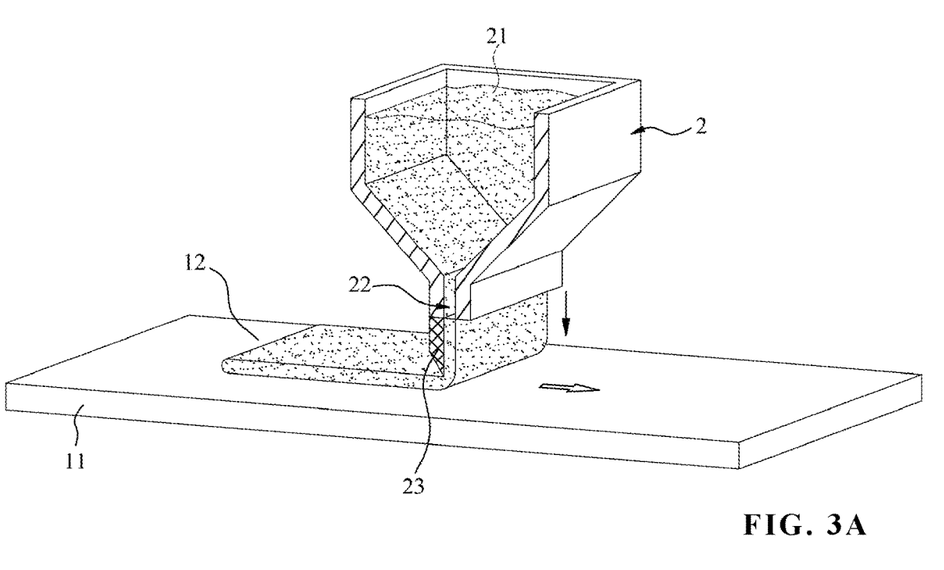
FIG. 3A is a schematic view showing the laying of a slurry to form a sacrificial layer in accordance with an embodiment of the present invention.

Reference is made to FIG. 3A, which illustrates laying a slurry according to an embodiment of the present invention. In the step Sb in the flow chart shown in FIG. 1, the slurry is uniformly laid on a substrate 11 by means of a feeding unit 2 to form a sacrificial layer 12. The feeding unit 2 includes a V-shaped funnel-hopper 21, and the bottom of the hopper 21 has a linear discharge port 22. While the feeding unit 2 moves once along the substrate 11 in a direction orthogonal to a longitudinal direction of the linear discharge port 22, the slurry in the hopper 21 is discharged from the linear discharge port 22 and directly laid on the substrate 11. In the present embodiment, the feeding unit 2 further includes a scraper 23 which is disposed on one side of the linear discharge port 22. Thereby, when the slurry is discharged from the hopper 21 via the linear discharge port 22, the scraper 23 can simultaneously flatten the slurry so that the slurry is uniformly formed as the sacrificial layer 12 in a rectangular shape on the substrate 11.

The feeding unit 2 of the embodiment is connected with a storage tank (not shown), and a fluid control valve (not shown) is disposed between the storage tank and the feeding unit 2. The fluid control valve controls the amount of slurry supplied to the feeding unit 2 each time from the storage tank, which is exactly the amount of slurry of the sacrificial layer 12 or the reaction layer 13 to be laid each time. Although the present embodiment discloses that the sacrificial layer 12 is laid by a single movement of the feeding unit 2, it is also known to those skilled in the art that a thicker sacrificial layer 12 can be formed by moving the feed unit 2 twice or more as desired.

In the present embodiment, the substrate 11 having high water absorbability is used, which is composed of a material or structure having a water absorption ratio of 5% or more, for example, a diatomaceous earth or a ceramic plate having a porous structure. Therefore, when the sacrificial layer 12 is laid and formed on the substrate 11, the water in the sacrificial layer 12 can be quickly absorbed, thereby greatly reducing time necessary for evaporation of water from the sacrificial layer 12 and improving the productivity.

Figure 3B:
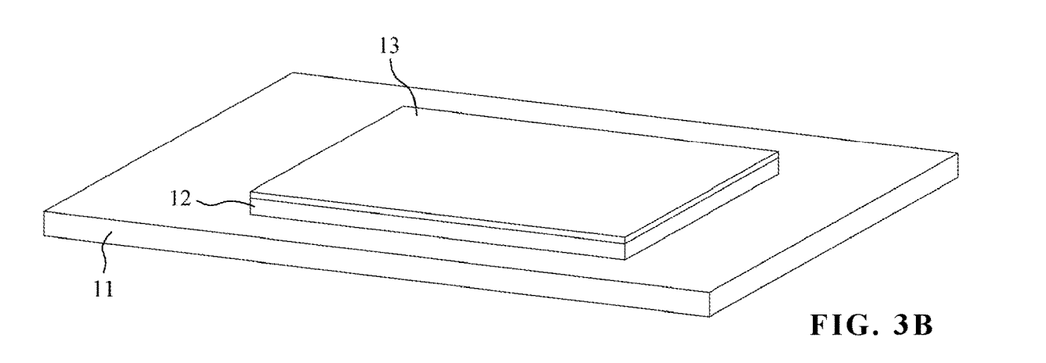
FIG. 3B is a schematic view showing the laying of a slurry to form a reaction layer in accordance with an embodiment of the present invention.

Reference is made to FIG. 3B, which illustrates a schematic view of laying a slurry as a reaction layer 13 according to an embodiment of the present invention. In the step Sc of the flow chart shown in FIG. 1, the slurry is discharged from the linear discharge port 22 of the feeding unit 2, so that the reaction layer 13 is formed by uniformly laying on the sacrificial layer 12 by a single movement of the feeding unit 2. Since the substrate 11 having a high water absorbability is used in the present embodiment, when the reaction layer 13 is laid on the substrate 11 located at the bottom layer in the step Sc, the substrate 11 will immediately absorb excess water or alcohols in the reaction layer 13, so that the reaction layer 13 can be irradiated with a light beam in the step Sd without any delay of time.

In the present embodiment, due to use of a solvent based on deionized water and a substrate 11 having a high water absorbability, when the reaction layer 13 is laid on the sacrificial layer 12 by the feeding unit 2, it can be cured without waiting for volatilization of the solvent. The time for manufacturing the ceramic object is greatly shortened.

Reference is made to FIG. 4A, which illustrates a schematic irradiating a light beam on a reaction layer according to an embodiment of the invention. In the step Sd of the flow chart shown in FIG. 1, the optical machine PR capable of emitting a light beam 3, such as a visible light or ultraviolet light, toward the reaction layer 13 is disposed above the substrate 11. In particular, the light beam 3 emitted from the optical machine PR partially irradiates the reaction layer 13 by using the projected slice graphic P as prepared in the step Sa, and hence the reaction layer 13 is irradiated by the light beam 3 to generate the cured zone 131, with an uncured zone 132 of the slurry in the reaction layer being not irradiated by the light beam 3, the uncured zone 132 surrounding the cured zone 131 and supporting the cured zone 131 due to its semi-wet viscous state. As such, an additional support member is unnecessary.

After the cured zone 131 in the reaction layer 13 is exactly cured, in the step Se of the flow chart shown in FIG. 1, the step Sc and the step Sd are repeated by using the projected slice graphics P prepared in the step Sa. A newly formed cured zone 131 in the newly formed reaction layers 13 is stacked on the previously formed cured zone 131 until a ceramic body 133 is formed, as shown in FIG. 4B. It should be particularly noted that since the optical machine PR is stationary, the substrate 11 should be lowered by a distance corresponding to the thickness of the reaction layer for each time when the reaction layer is formed.

The slurry of the uncured zone 132 can be easily dissolved by warm water or organic solvent of 25-50° C. slightly higher than room temperature in step Sf, so that a precise appearance of the ceramic body 133 can be obtained without refining a surface of the ceramic body 133. In this embodiment, the plasticizer has good hydrophilicity. Although the slurry is dehydrated after the laminated layer is dried, the plasticizer is helpful for maintaining the shape of the body. When the plasticizer is soaking in water, it can dissolve (the water at 25~50° C. will accelerate the dissolution), as a result of which, the uncured material will be disaggregated.

The water-based photo-curable resin used in the present embodiment will absorb water and hence expand by about 5% to 15% by volume. The expanded uncured material will loosen the structure of the material. It is also advantageous for cleaning the ceramic body 133 and finishing the production of the ceramic body 133. The slurry which is dissolved by water or organic solvent can be recycled and reused, and hence the cost can be effectively reduced.

Figure 5:
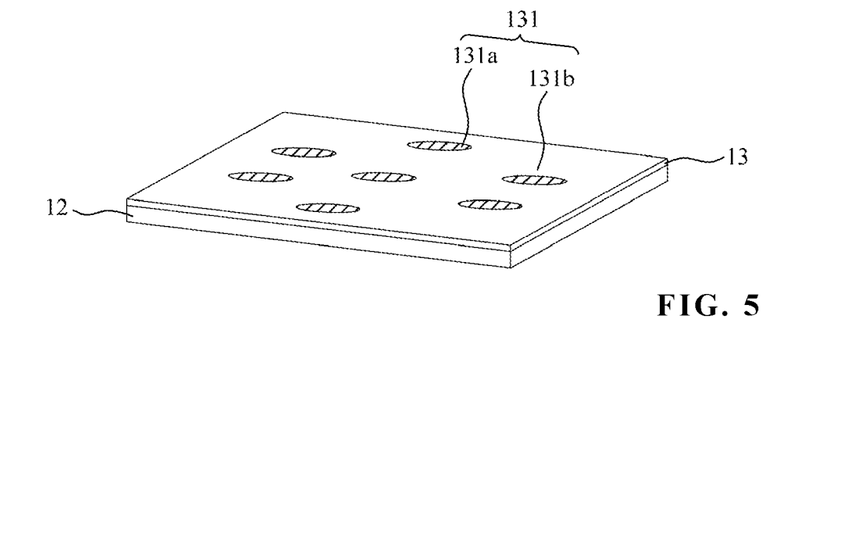
FIG. 5 is a schematic view showing simultaneously laminating a plurality of ceramic bodies in accordance with another embodiment of the present invention.

Reference is made to FIG. 5, which is a schematic view of simultaneously forming a plurality of ceramic bodies according to another embodiment of the present invention. As shown in FIG. 5, the embodiment is characterized in that a batch of ceramic bodies are simultaneously manufactured. A plurality of three-dimensional images of the ceramic objects to be formed are arranged in the same projected slice graphic P, the optical machine can simultaneously emit a plurality of spots and generate a plurality of cured zones 131a, 131b on the reaction layer 13, so that a plurality of ceramic bodies which may have the same shape or different shapes can be produced in batch by repeating the steps Sc and Sd. The productivity is greatly increased.

Figure 6:
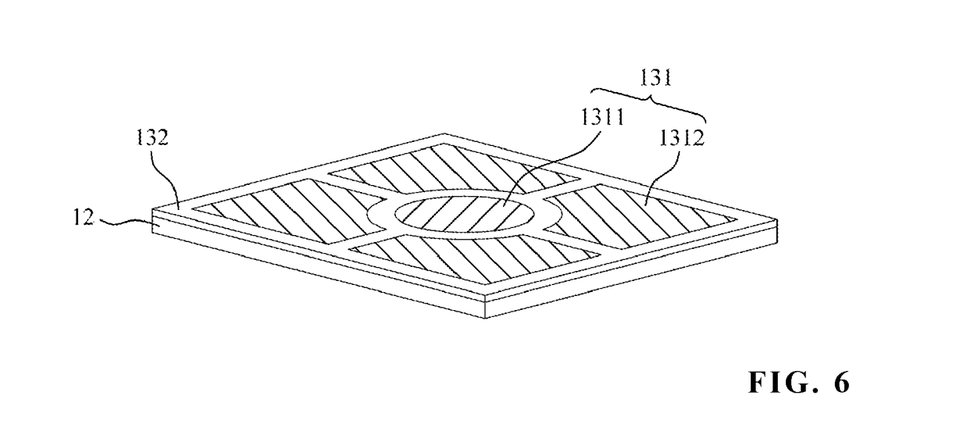
FIG. 6 is a schematic view showing that a ceramic body and a recovery body are formed on a reaction layer in accordance with still another embodiment of the present invention.

Reference is made to FIG. 6, which is a schematic view showing a ceramic body and a slurry recovery body formed on a reaction layer according to still another embodiment of the present invention. In this embodiment, the projected slice graphic includes the slice patterns corresponding to the three-dimensional image of the ceramic object and further includes at least one slurry recovery pattern When the light beam passes through a projected slice graphic and irradiates on a corresponding reaction layer 13, a cured zone 131 in the reaction layer 13 is formed, which includes the cured zone 1311 of the ceramic body and the cured zones 1312 of the recovery body formed around the cured zone 1311 of the ceramic body. In this manner, time necessary for the step Sf can be shortened, separation of the slurry of the uncured zone 132 by using water or organic solvent is improved, and the recovery body of the cured zone 1312 of the cured recovery body can be directly recycled, and then be grounded as powder for reuse.

In the step Sg of the embodiment, the ceramic body 133 formed in the ceramic body cured zone 1311 is sintered at a high temperature. Specifically, the ceramic is sintered at a high temperature of 1100° C. to 1700° C. (generally, the sintering temperature for glass ceramic ranges from about 1100° C. to about 1300° C., the sintering temperature for zirconium oxide ranges from 1300° C. to 1600° C., and the sintering temperature for aluminum oxide 1300° C.~1700° C.). A smooth and flat surface of the ceramic object is formed, and the procedure for removing support members and refining appearance is not necessary.

In summary, the present invention has at least the following advantages:

(1) The three-dimensional laminate technique is used to prepare a ceramic object, so that the contour and shape of the ceramic object are not limited, and a relatively fine shape or surface appearance can be made.

(2) The sacrificial layer itself is capable of serving as a support member, that is, the ceramic object can be directly formed without additional support members, and the procedure for removing support members and deburring can be omitted.

(3) The ceramic object is formed by using the slice graphic, so that in the same process, a plurality of ceramic objects which may have the same shape or different shapes can be simultaneously produced.

(4) Both of the sacrificial layer and the slurry recovery body can be recycled and the slurry contained therein can be reused. It is not only environment friendly but also capable of reducing the cost of material.

(5) With the aid of the water absorption characteristics of the substrate, the slurry can be subjected to a curing process immediately after the slurry is laid. Time necessary for forming the ceramic body is greatly shortened.

(6) With the aid of a water-based material, water serving as solvent or main solvent and a water-soluble photo-curable resin which are safe, non-toxic, and can be early clean can be used.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention according to the accompanying claims.

LIST OF REFERENCE NUMBERALS

P projected slice graphic
P_1 to P_n projected slice graphics
PR optical machine
R three-dimensional image data
2 feeding unit
3 light beam
11 substrate
12 sacrificial layer
13 reaction layer
21 hopper
22 linear discharge port
23 scraper
130 ceramic body layer
131 cured zone
131a cured zone
131b cured zone
1311 cured zone
1312 cured zone
132 uncured zone 132 uncured zone
133 ceramic body

What is claimed is:

1. A method of manufacturing a ceramic object using a water-based ceramic three-dimensional laminate material, comprising:

a step (Sa) of preparing a plurality of projected slice graphics and a slurry, wherein the projected slice graphics are generated by slicing a three-dimensional image along a specific direction with a specific thickness; the slurry is prepared by mixing material powder, photo-curable resin, solvent and additive; the photo-curable resin comprising at least one of a water-soluble resin and a water-dispersible resin; the solvent is water or a mixed solvent comprising water and alcohols, and the additive includes at least one of a dispersing agent, a binder, and a plasticizer;

a step (Sb) of uniformly laying the slurry on a substrate to form a sacrificial layer;

a step (Sc) of uniformly laying the slurry on the sacrificial layer to form a reaction layer;

a step (Sd) of irradiating a light beam to the reaction layer by using one of the plurality of projected slice graphics, wherein the slurry in the reaction layer irradiated by the light beam is cured and solidified, wherein the light beam emitted from a light source is a visible light or an ultraviolet light, and the light source is provided above the substrate;

a step (Se) of repeating the steps (Sc) and (Sd) until a ceramic body is formed;

a step (Sf) of cleaning the ceramic body; and a step (Sg) of sintering the ceramic body at a high temperature to form a ceramic object, characterized in that:

the material powder for preparing the slurry comprises at least one of aluminum oxide powder, zirconium oxide powder, and glass ceramic powder and the substrate is composed of a material or structure having a water absorption rate of 5% or more.

2. The method of claim 1, wherein each of the projected slice graphics includes a slice pattern of the three-dimensional image of the object and at least one slurry recovery pattern; the ceramic body composed of the slice patterns and a recovery body composed of the slurry recovery patterns are formed in Step (Se); and the recovery body are recycled in the step (Sf).

3. The method of claim 1, wherein in the step (Sf), the ceramic body is cleaned with water or an organic solvent at a temperature of 25 to 50° C.

* * * * *